(12) United States Patent
Fleck et al.

(10) Patent No.: US 6,945,567 B2
(45) Date of Patent: Sep. 20, 2005

(54) FLEXIBLE PIPE CONNECTING UNIT

(75) Inventors: Andreas Fleck, Garbsen (DE); Olaf Kluth, Hannover (DE)

(73) Assignee: ContiTech Luftfedersysteme GmbH, Hannover (DE)

(*) Notice: Subject to any disclaimer, the term of this patent is extended or adjusted under 35 U.S.C. 154(b) by 106 days.

(21) Appl. No.: 10/627,679

(22) Filed: Jul. 28, 2003

(65) Prior Publication Data

US 2004/0051310 A1 Mar. 18, 2004

(30) Foreign Application Priority Data

Jul. 27, 2002 (DE) ......................................... 102 34 362

(51) Int. Cl.[7] ............................................. F16L 21/00
(52) U.S. Cl. ..................................... 285/229; 285/226
(58) Field of Search ........................ 285/148.28, 148.3, 285/148.8, 223, 226, 227, 228, 229, 238, 363, 379, 405, 903, 328

(56) References Cited

U.S. PATENT DOCUMENTS

| | | | | |
|---|---|---|---|---|
| 3,666,296 A | * | 5/1972 | Fischetti ..................... | 285/229 |
| 4,293,152 A | * | 10/1981 | Berghofer ................... | 285/229 |
| 4,765,660 A | * | 8/1988 | Maier .......................... | 285/229 |
| 5,174,613 A | * | 12/1992 | Joug ............................ | 285/229 |
| 5,273,321 A | * | 12/1993 | Richter ........................ | 285/229 |
| 6,076,864 A | * | 6/2000 | Levivier et al. ............ | 285/226 |

FOREIGN PATENT DOCUMENTS

DE 3923344 A * 2/1990 ................. 285/229

* cited by examiner

Primary Examiner—Aaron Dunwoody
(74) Attorney, Agent, or Firm—Walter Ottesen

(57) ABSTRACT

The invention is directed to a flexible pipe connecting unit which includes a part made of elastic workable material. The pipe connecting unit includes a wave-shaped or hose-shaped bellows (4) made of elastomeric material. The bellows (4) has respective projecting flange collars (14; 14 a, 14b) at its respective ends. The flange collars (14; 14a, 14b) preferably are provided with a reinforcement insert (16; 16a, 16b) and annularly-shaped pipe connecting pieces (flanges 18; 18a, 16b) are disposed behind corresponding ones of the flange collars. The pipe connecting unit (2) coacts directly with weld-on flanges as counter flanges (20; 20a, 20b) without additional seals or corresponding joining locations. For this purpose, the end sealing faces of the flange collars (14; 14a, 14b) are partitioned in the radial direction by a peripherally extending slot (28; 28a, 28b). In this way, at least two coaxial concentric annularly-shaped sealing surfaces (14-I, 14-II) are formed. With outer weld-on or slip-on flanges (20; 20a, 20b), only corresponding ones of the outer annular sealing Surfaces (14-I) are in contact engagement and, when the counter flange (20; 20a, 20b) is a welding-neck flange, at least the outer sealing annular surface (14-I) comes into contact engagement. A stabilization ring (32) can be implanted in the slot (28; 28a, 28b) of the flange collar (14; 14a, 14b) between the outer annular sealing surface (14-I) and the inner annular sealing surface (14-II).

9 Claims, 3 Drawing Sheets

Prior Art

FLEXIBLE PIPE CONNECTING UNIT

FIELD OF THE INVENTION

The invention relates to a flexible pipe connecting unit or so-called compensator made of elastic deformable material having formed-on outwardly projecting end flanges.

BACKGROUND OF THE INVENTION

Annular-shaped pipe connecting pieces made of metal function to attach to counter flanges of the pipe ends. The annular-shaped pipe connecting pieces engage behind the end flanges of the pipe connecting unit.

These compensators are utilized in pipelines subjected to thermal load for taking up expansions. Compensators are also used for attenuating vibrations and noise of equipment to be connected such as motors, pumps and the like. Likewise, building in rubber compensators is recommended to effectively interrupt the transmission of structure-borne noise and water-borne noise. Finally, a compensation of assembly inaccuracies can be undertaken with these compensators.

The most varied types of connecting units are known for pipelines. These connecting units each include an elastic, wave-shaped or hose-shaped bellows having connecting pieces incorporated at the ends thereof.

The compensator is preferably stiffened at its end flanges by annular-shaped inserts so that the bellows do not get torn out of the flange connection by the tension and compressive loads occurring during operation.

As a counter flange, standard welding neck flanges having a sealing bead are used which join at the end face to the pipeline. These welding neck flanges are, for example, in accordance with DIN 2633 (German Industrial Standard 2633). As a rule, additional seals when building in the rubber compensator are not required.

The elastomeric material of the rubber bellows is relatively sensitive to the formation of notches. For this reason, the sealing surfaces of the counter flanges must perforce be planar and offer a contact engaging surface for the entire seal surface of the compensator (see FIG. 4a herein). Flange embodiments having tongue and groove or flanges, which do not engage on the full surface, lead, in a short time, to fissure formations in the sealing surface and therefore to a failure of the rubber body.

FIGS. 4a to 4e herein show various examples for attaching compensators known per se. Thus, FIG. 4a shows a so-called slip-on flange (for example, DIN 28031) as a counter flange. This flange is soldered on the outside to the pipe end to be connected or is welded thereto. The sharp inner edge of the pipeline generates a notch in the rubber sealing surface. Notches of this kind ultimately lead to a destruction of the bellows under compression and tension loading.

The embodiment shown in FIG. 4b is of a slip-on flange. In this embodiment, a rough pipe end can cause damage to the rubber sealing surface. FIG. 4c shows a counter flange having an inner diameter which is too large. Such flanges can also damage the rubber sealing surface.

FIG. 4d shows a connection wherein the counter flange is configured as a so-called welding-neck flange. This does provide a problem-free seal-tight attachment but welding-neck flanges are expensive to manufacture.

A flat seal 30 can be additionally used as shown in FIG. 4e when there is a danger of damage with the embodiments shown in FIGS. 4a to 4c. However, this is an additional part and therefore constitutes an additional cost factor and makes assembly of the compensator in the pipeline more difficult. The problem of damage (see FIGS. 4a, 4b or 4c) is more likely to occur when such a flat seal is inadvertently omitted.

The compensator is intended to function together with welded-on flanges as a counter flange without additional seals or corresponding preparation of the joining location.

SUMMARY OF THE INVENTION

The pipe connecting unit of the invention is for connecting a first pipe to a second pipe. The pipe connecting unit includes: a bellows body made of elastomer material and having first and second ends; the bellows body having projecting flange collars at the first and second ends, respectively; first and second annular holding flanges mounted behind corresponding ones of the flange collars and each of the holding flanges being configured to engage and grasp the flange collar corresponding thereto; first and second pipe mounted flanges mounted on corresponding ones of the first and second pipes; the first and second pipe mounted flanges being slip-on flanges joined to the first and second pipes at corresponding end portions thereof; the flange collars defining respective end sealing surfaces facing toward the slip-on flanges; each of the end sealing surfaces being partitioned in radial direction into at least inner and outer concentric annular sealing surfaces by a peripherally extending slot formed in the end sealing surface; and, only the outer annular sealing surface being in sealing contact engagement with the slip-on flange corresponding thereto when the holding flange is drawn toward and secured to the corresponding slip-on flange.

In the pipe connecting unit of the invention, the shearing stresses, which occur in the sealing surface material, are avoided by a cutout in the critical region.

The pipe connecting unit or compensator of the invention includes a sealing surface which is suitable especially for slip-on flanges. The compensator can be universally used in pipeline construction without special conditions.

A form-stable component (for example, metal, thermoplast, et cetera) can be used in the cutout in order to avoid a flowing of the sealing surface material and to introduce a defined compressive stress in the sealing surface. In this way, a stable sealing surface structure is provided.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
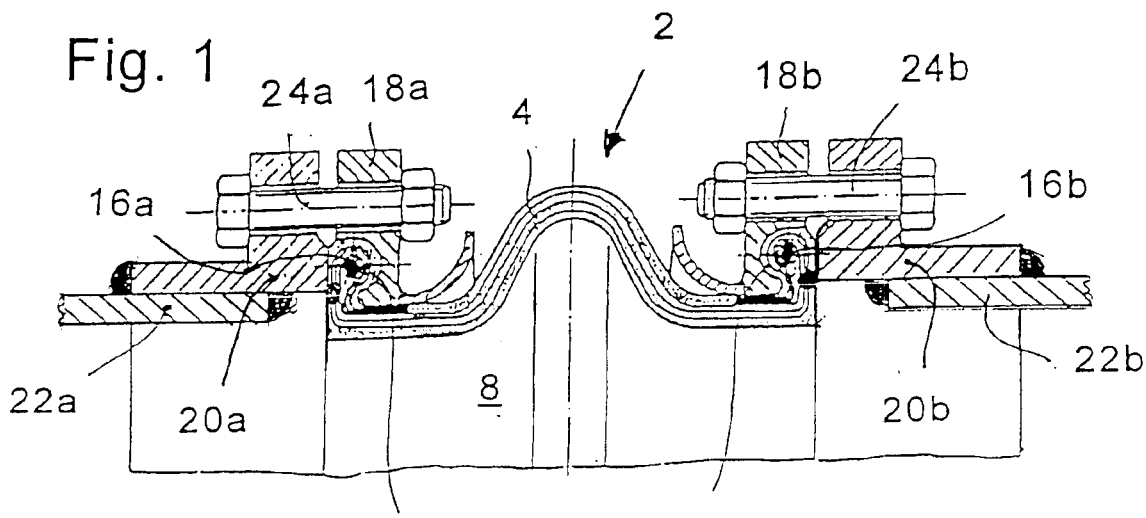
FIG. 1 is a partial longitudinal section view of a pipe connecting unit according to the invention and is shown built into a pipe between two pipe end portions.

The pipe connecting unit 2 shown in the drawing is a compensator for use in pipelines subjected to pressure and includes a bellows 4 made of elastic workable material.

Figure 2:
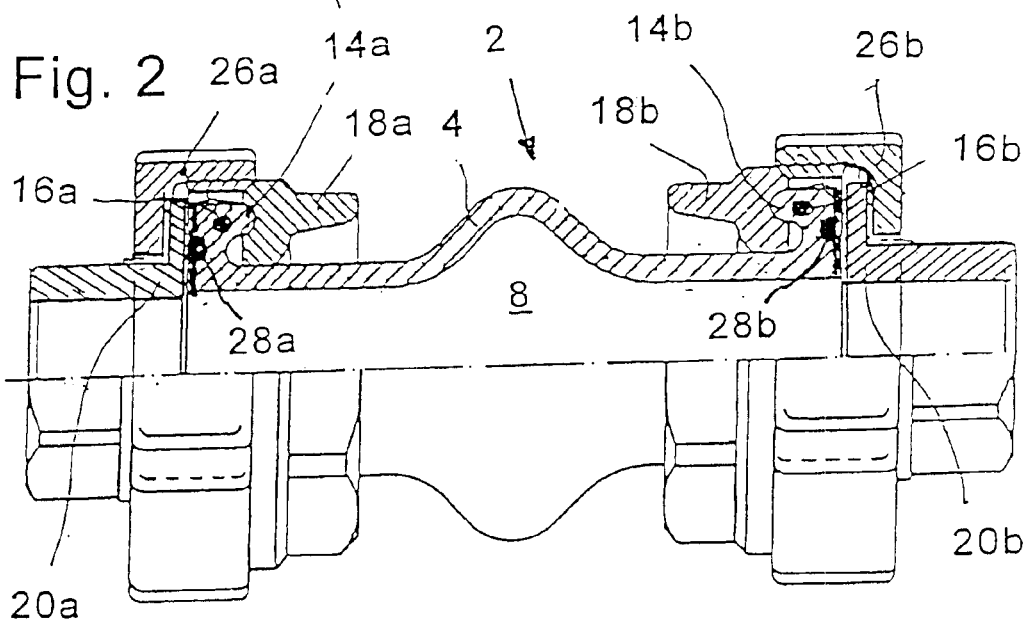
FIG. 2 is a longitudinal view, partially in section, of a complete pipe connecting piece including threaded-fastener connections.

As shown in FIGS. 1 and 2, the bellows 4 is a wavy or cylindrical rubber body having bead-shaped flange collars (14a, 14b) at respective ends thereof with these flange collars being formed so as to extend outwardly. The flange collars (14a, 14b) have respective reinforcements (16a, 16b). The reinforcements need not be realized by a wire but can, for example, also be a spiral spring, hard rubber or thermoplast. An embodiment without separate reinforcement is also an option. Steel flanges (18a, 18b) are mounted before or after vulcanization and are disposed behind the flange collars (14a, 14b). The steel flanges (18a, 18b) are holding flanges and engage and grasp the flange collars (14a, 14b) corresponding thereto.

The flanges (18a, 18b) are made of carbon steel, special alloy steel or aluminum. Plastic flanges (for example, made of polyamide) can be used with smaller dimensions.

The pipe ends (22a, 22b), which are to be connected, are provided with mating or counter flanges (20a, 20b). The connection of the counter flanges (20a, 20b) with the holding flanges (18a, 18b) can, for example, be undertaken by means of threaded fasteners (24a, 24b) as shown in FIG. 1 or by means of cap nuts (26a, 26b) as shown in FIG. 2.

Figure 3:
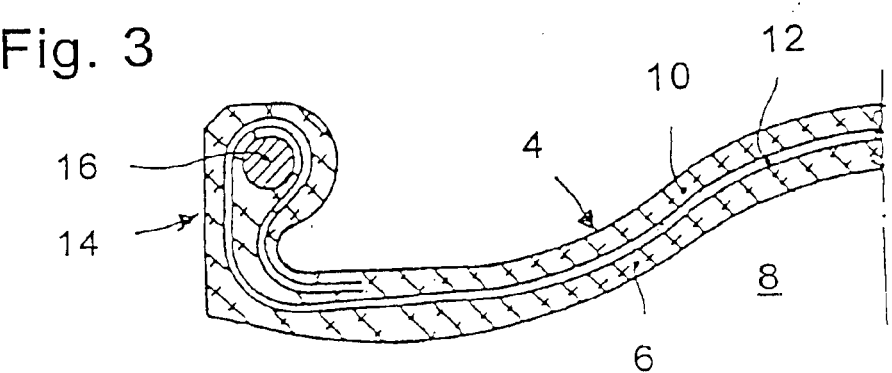
FIG. 3 is a section view of a three-layer bellows.
Figure 4A:
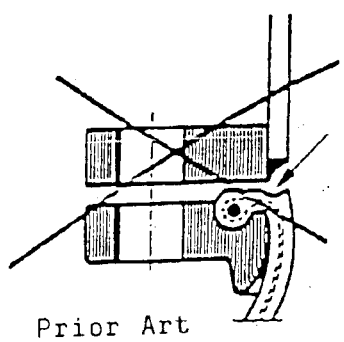
FIGS. 4a to 4e show different possibilities of proper and improper assembly of pipe connecting pieces.
Figure 4B:
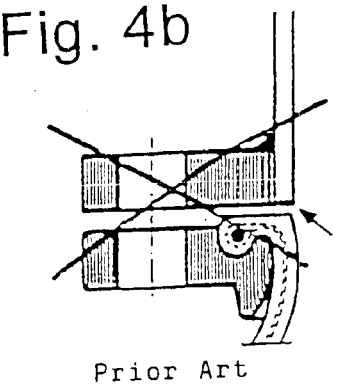
Figure 4C:
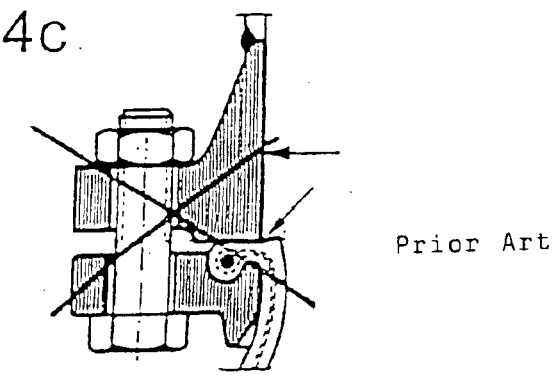
Figure 4D:
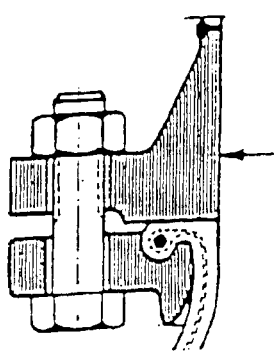
Figure 4E:
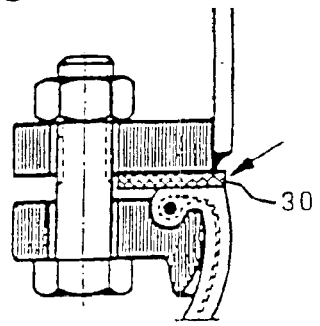

The detail view shown in FIG. 3 shows a three-layer buildup of the bellows 4. The inner layer 6 faces toward the medium 8 which is to be conducted by the pipeline. The inner layer 6 is made of rubber or other elastomeric material and forms a good seal and is durable. The outer layer or cover 10 provides effective resistance against environmental influences such as solar radiation and chemically aggressive substances. A reinforcement layer 12 is disposed between the inner layer 6 and the cover 10 and can include multiple sublayers which comprise textile or metal cords or textile or metal filaments which are arranged crosswise with respect to each other and are embedded in elastomeric layers.

Reference numeral 14 identifies a bead-shaped flange collar which has a reinforcement insert 16.

Figure 5:
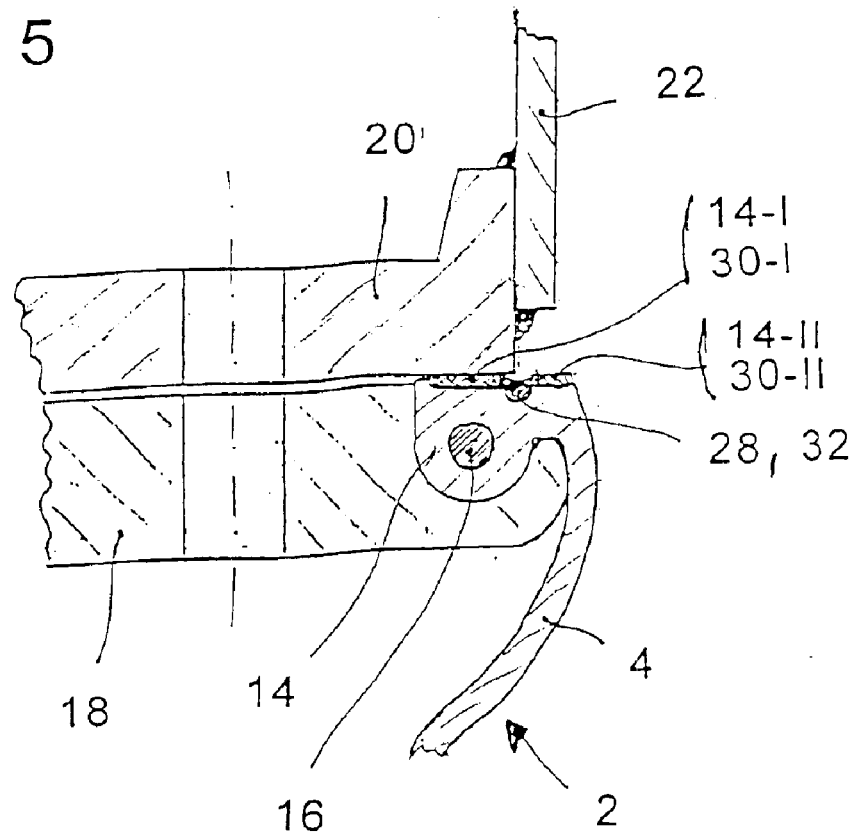
FIG. 5 is a detail view, in section, showing the joining location between a pipe end and the bellows for the pipe connecting unit of the invention; and, FIG. 6 shows a detail view, in section, of an end portion of the bellows in accordance with an embodiment of the pipe connecting unit of the invention.

In FIG. 5, the outer end of a pipe end portion 22 is connected to a counter flange 20 utilizing solder or is welded thereto. The bead-shaped flange collar 14 of the pipe connecting unit 2 is connected to the counter flange 20 with the aid of a holding flange 18 which engages behind the flange collar 14. The bead-shaped flange collar 14 includes a reinforcement 16 in the form of an annularly-shaped insert which can be elastic as may be required.

What is of particular interest on the flange collar 14 is that the end face sealing surfaces of the flange collar (sealing collar) 14 are divided in the radial direction by a peripherally extending slot 28 so that at least two coaxial concentric annular sealing surfaces 14-I and 14-II are formed. Only the outer sealing ring surface 14-I is in contact engagement for working together with the counter flange 20. When working together with the welding-neck flange as the counter flange 20, both sealing surfaces 14-I and 14-II would be in contact engagement.

From FIG. 5, it can be seen that the annularly-shaped sealing surfaces 14-I and 14-Il are covered with annularly-shaped sealing discs 30-I and 30-II which are vulcanized thereto.

Figure 6:
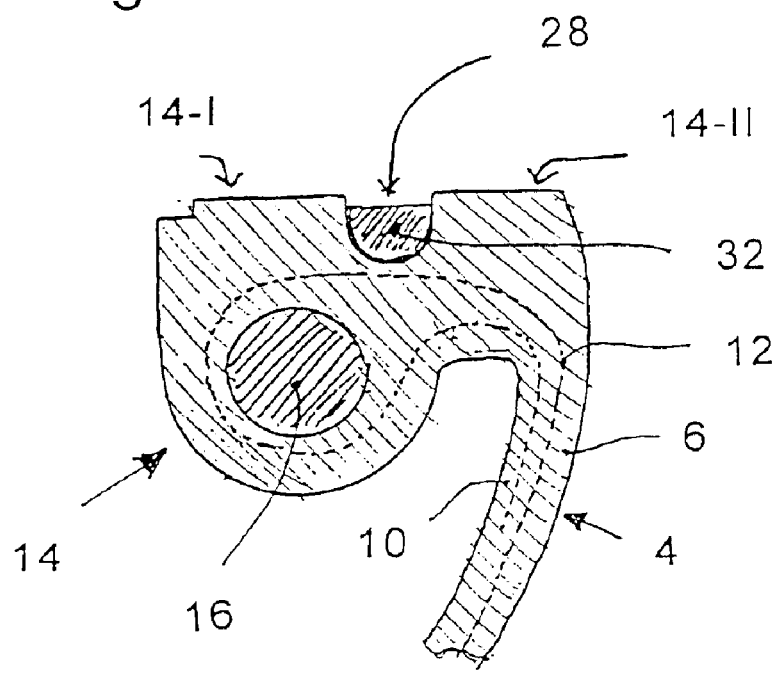

FIG. 6 shows an end portion of the flange collar 14 by itself and enlarged. A stabilization ring 32 is implanted in the slot 28 of the sealing collar 14 between the outer annular sealing surface 14-I and the inner annular sealing surface 14-II. This stabilization ring 32 is preferably form stable. It can be made of metal, thermoplast or elastomer.

It is understood that the foregoing description is that of the preferred embodiments of the invention and that various changes and modifications may be made thereto without departing from the spirit and scope of the invention as defined in the appended claims.

What is claimed is:

1. A pipe connecting unit for connecting a first pipe to a second pipe, the pipe connecting unit comprising:

a bellows body made of elastomer material and having first and second ends;

said bellows body having projecting fiance collars at said first and second ends, respectively;

first and second annular holding flanges mounted behind corresponding ones of said flange collars and each of said holding flanges being configured to engage and grasp the flange collar corresponding thereto;

first and second pipe mounted flanges mounted on corresponding ones of said first and second pipes;

said first and second pipe mounted flanges being slip-on flanges joined to said first and second pipes at corresponding end portions thereof;

said flange collars defining respective end sealing surfaces facing toward said slip-on flanges;

each of said end sealing surfaces being partitioned in radial direction into at least inner and outer concentric annular sealing surfaces by a peripherally extending slot formed in the end sealing surface;

only the outer annular sealing surface being in sealing contact engagement with the slip-on flange corresponding thereto when the holding flange is drawn toward and secured to the corresponding slip-on flange; and, a stabilization ring implanted in said slot at each end of said bellows body.

2. The pipe connecting unit of claim 1, further comprising first and second annular sealing discs connected to corresponding ones of said inner and outer annular sealing surfaces at each end of said bellows body; and, said sealing discs all being made of elastomeric or thermoplastic material.

3. The pipe connecting unit of claim 1, wherein said stabilization ring is stable as to form and is made of a material of one of the following materials: metal, elastomer or thermoplast.

4. The pipe connecting unit of claim 1, wherein each of said flange collars has a reinforcement layer formed therein.

5. A pipe connecting unit for connecting a first pipe to a second pipe, the pipe connecting unit comprising:

a bellows body made of elastomer material and having first and second ends;

said bellows body having projecting flange collars at said first and second ends, respectively;

first and second annular holding flanges mounted behind corresponding ones of said flange collars and each of said holding flanges being configured to engage and grasp the flange collar corresponding thereto;

first and second pipe mounted flanges provided on corresponding ones of said first and second pipes;

said first and second pipe mounted flanges being welding-neck flanges at corresponding end portions of said first and second pipes;

said flange collars defining respective end sealing surfaces facing toward said welding-neck flanges;

each of said end sealing surfaces being partitioned in radial direction into at least inner and outer concentric annular sealing surfaces by a peripherally extending slot formed in the end sealing surface;

at least the outer annular sealing surface being in sealing contact engagement with the welding-neck flange corresponding thereto when the holding flange is drawn toward and secured to the corresponding welding-neck flange; and, a stabilization ring implanted in said slot at each end of said bellows body.

6. The pipe connecting unit of claim 5, further comprising first and second annular sealing discs connected to corresponding ones of said inner and outer annular sealing surfaces at each end of said bellows body; and, said sealing discs all being made of elastomeric or thermoplastic material.

7. The pipe connecting unit of claim 5, wherein said stabilization ring is stable as to form and is made of a material of one of the following materials: metal, elastomer or thermoplast.

8. The pipe connecting unit of claim 5, wherein each of said flange collars has a reinforcement layer formed therein.

9. The pipe connecting unit of claim 5, wherein both of said annular sealing surfaces are in sealing contact engagement with the welding-neck flange.

* * * * *

UNITED STATES PATENT AND TRADEMARK OFFICE
CERTIFICATE OF CORRECTION

PATENT NO. : 6,945,567 B2
DATED : September 20, 2005
INVENTOR(S) : Andreas Fleck and Olaf Kluth It is certified that error appears in the above-identified patent and that said Letters Patent is hereby corrected as shown below:

Title page,
Item [57], ABSTRACT,
Line 9, delete "16*b*)" and substitute -- 18*b*) --, therefor.
Line 19, delete "Surfaces," and substitute -- surfaces -- therefor.

Column 4,
Line 11, delete "fiance" and substitute -- flange -- therefor.

Signed and Sealed this

Twenty-second Day of November, 2005

JON W. DUDAS
*Director of the United States Patent and Trademark Office*